United States Patent [19]

Umezawa

[11] Patent Number: 5,324,081
[45] Date of Patent: Jun. 28, 1994

[54] CONNECTOR FOR PIPES HAVING A SMALL DIAMETER

[75] Inventor: Katsushi Umezawa, Numazu, Japan

[73] Assignee: Usui Kokusai Sangyo Kaisha Ltd., Japan

[21] Appl. No.: 38,513

[22] Filed: Mar. 29, 1993

[30] Foreign Application Priority Data

Mar. 30, 1992 [JP] Japan .................................. 4-103484

[51] Int. Cl.5 .......................................... F16L 55/00
[52] U.S. Cl. .................... 285/86; 285/308; 285/319; 285/330; 285/906; 285/921
[58] Field of Search .............. 285/319, 921, 233, 320, 285/86, 308, 330, 904

[56] References Cited

U.S. PATENT DOCUMENTS

| | | | |
|---|---|---|---|
| 3,997,196 | 12/1976 | Karcher et al. | 285/319 X |
| 5,090,748 | 2/1992 | Usui et al. | 285/921 X |
| 5,112,084 | 5/1992 | Washizu | 285/319 X |
| 5,123,677 | 6/1992 | Kreczko et al. | 285/92 X |

FOREIGN PATENT DOCUMENTS 992488  5/1965  United Kingdom ................ 285/233

Primary Examiner—Dave W. Arola
Attorney, Agent, or Firm—Anthony J. Casella; Gerald E. Hespos

[57] ABSTRACT

A connector for coupling pipes having a small diameter includes a generally cylindrical main body 1 having a connecting end portion 2, a small-diameter chamber 3' which is larger in diameter than the bore of the end 2, and a large-diameter chamber 3. The end portion 2 and the chambers 3' and 3 are coaxially connected with one another. The large-diameter chamber 3 is surrounded by a wall having a pair of window openings 9, and a pair of resilient arms 7 each lying in one of the window openings 9 and having a radially inwardly bent pawl 5. The small-diameter chamber 3' contains seal rings 6, a bush 12 and a sleeve 13 positioned on the opposite side of the seal rings from the bush, which are all fitted about a pipe P connected in the main body 1. The large-diameter chamber 3 contains a cylindrical holding member 8 having an inner surface portion engaged with a wall portion of the pipe P, and an outer surface having a shoulder against which the pawls 5 are held.

16 Claims, 12 Drawing Sheets

PRIOR ART

CONNECTOR FOR PIPES HAVING A SMALL DIAMETER

BACKGROUND OF THE INVENTION

1. Field of the Invention

This invention relates to a connector for coupling metal or resin pipes or tubes having a relatively small diameter not exceeding about 20 mm which are often used to form a path for the supply of a fluid, such as oil or air, to or in automobiles, machines or equipment.

2. Description of the Prior Art

A known connector is disclosed in Japanese Utility Model Application laid open under No. 82192/1986. It comprises a collar 21 having an open-ended large-diameter rear portion 22 with a large inside diameter, and a pawl 23 formed by a part of the wall of the large-diameter portion bent radially inwardly and extending toward a small-diameter front portion 22' with a small inside diameter, a seal ring 24 fitted in an annular groove 25 formed in the inner surface of the small-diameter portion 22', and a pipe $P_1$ having a flange $P_1'$ held by the pawl 23, and an inner tubular portion $P_1''$ held in intimate contact with the seal ring 24, as shown in FIG. 28 of the accompanying drawings.

This connector has, however, a number of drawbacks. As the flange $P_1'$ forms an integral part of the pipe $P_1$, it is necessary to employ a pipe having a large wall thickness and cut away a substantial portion of its wall thickness to form a flange having a large outside diameter. As a matter of fact, however, it is impossible to form the flange $P_1'$ with a diameter which is sufficiently large to ensure that it be held firmly in position by the pawl 23, so that there may not be any displacement of the flange and the pawl from each other when they are vibrated. The work of cutting away a substantial portion of the pipe wall is likely to bring about a serious reduction in the productivity of a process for manufacturing the connector. Moreover, the axial displacement of the pipe $P_1$ in the collar 21 as a result of, for example, the vibration of an engine causes the wear of the seal ring 24 and thereby a lowering of its sealing property.

Another known connector is disclosed in Japanese Patent Publication No. 10711/1989. It comprises a housing 21 forming its main body and having a large-diameter chamber 22 and a small-diameter chamber 26, a pipe $P_1$ extending into the housing 21 through its rear end having a flange 21', and having a radially outwardly projecting wall portion $P_1'$, a holding element 23 inserted in the large-diameter chamber 22 about the pipe $P_1$, and having a pair of grip tabs 24 projecting from the housing 21, a mid-wall portion engaging the flange 21' and a pair of pawls 24' formed at its inner end and held against the wall portion $P_1'$ of the pipe $P_1$ to hold the pipe $P_1$ in position, as shown in FIG. 29. The small-diameter chamber 26 contains seal rings 25 formed from e.g. rubber, and held in contact with the pipe $P_1$.

This device also has a number of drawbacks. The large-diameter chamber 22 of the housing 21 unavoidably has between the pipe $P_1$ and the holding element 23 a large free space which is so large that the undesirable axial or radial movement of the pipe $P_1$ is likely to result from any vibration transmitted to the connector and cause the abrasion or wear of the seal rings 25 which makes them incapable of maintaining a tight seal for a long period of time. It is likely that the holding element 23 may be disengaged from the projecting wall portion $P_1'$ of the pipe $P_1$, if its grip tabs 24 projecting from the housing 1 are inadvertently contacted by anybody, or anything else, or receive any impact.

SUMMARY OF THE INVENTION

Under these circumstances, it is a first object of this invention to provide a connector which can maintain a firm and reliable joint resisting vibration for a long period of time, is easy to manufacture by a process of improved productivity, and ensures a seal of improved durability for a fluid flowing therethrough.

It is a second object of this invention to provide a connector which can eliminate any undesirable free space surrounding a pipe and thereby any relative displacement thereof irrespective of any vibration transmitted to the connector, or pipe, or any inadvertent interference, and thereby maintain a tight seal for a long period of time, and makes it possible to ascertain visually if the pipe is properly held therein.

According to a first aspect of this invention, the first object thereof is attained by a connector which comprises a main body defining a small-diameter chamber connected with the bore of a cylindrical connecting end portion coaxially therewith and having a diameter which is larger than that of the bore, and a large-diameter chamber connected with the small-diameter chamber coaxially therewith and having a diameter which is larger than that of the small-diameter chamber, the large-diameter chamber being surrounded by a wall having a pair of window openings, the main body having a pair of resilient arms each forming an integral part of the wall, extending in one of the window openings from its edge remote from the small-diameter chamber, and having an inwardly bent free end defining a pawl; a plurality of seal rings fitted in the small-diameter chamber; and a cylindrical holding member housed in the large-diameter chamber and having on its inner surface at its end near the small-diameter chamber an interlocking portion which is engageable with a wall portion of a pipe inserted in the holding member, while its outer surface has a shoulder against which the pawls are held to hold the holding member in position.

As the shoulder against which the pawls are held is formed on the holding member, and not on the pipe, it has a diameter which is sufficiently large to prevent any inadvertent disengagement of the pawls in an environment causing vibration and thereby ensure that the holding member be held in position to hold the pipe properly for a long period of time. The interlocking wall portion of the pipe is easy to form, since it is no longer necessary to cut away any substantial amount of material from its outer surface.

The small-diameter chamber is preferably provided between the seal rings and the large-diameter chamber with a bush having an end bearing on a shoulder dividing the large-diameter chamber from the small-diameter chamber, and is also provided on the opposite side of the seal rings from the bush with a sleeve having a plurality of resilient pawls bearing on the pipe radially inwardly at its end located adjacent to the bore of the connecting end portion.

The bush preferably has a plurality of resilient pawls which project radially outwardly into the large-diameter chamber, and urge back the holding member so that the holding member may be properly positioned between the bush and the pawls of the resilient arms on the main body to prevent any axial displacement of the pipe relative to the main body of the connector. Moreover, the radially outwardly projecting pawls define a tapered or conical surface bearing on a shoulder on the holding member, and thereby keep the holding member in a properly centered position to prevent any radial displacement of the pipe. The sleeve holds the pipe against any radial displacement, and also prevents any axial displacement of the pipe relative to the main body by virtue of the spring force of its resilient pawls. Thus, the bush and sleeve cooperate with the holding member to prevent any axial and radial displacement of the pipe relative to the main body of the connector, so that the seal rings may not be undesirably worn, but may have an improved degree of durability.

The interlocking engagement of the holding member and the pipe may be achieved by a groove or recess formed in the surface of one of them and a projection formed on the surface of the other. The holding member may be of the split construction. The pawls of the resilient arms on the main body and the shoulder on the holding member against which those pawls are held may have mutually complementary inclined surfaces.

According to a second aspect of this invention, the second object thereof is attained by a connector as described above, and further including a cylindrical locking member fitted movably on the main body. The locking member may likewise have window openings and pawls to establish a ratchet engagement with the main body of the connector, and may be rotatable or axially slidable on the main body into its locking position in which it locks the pawls of the resilient arms on the main body in their closed position in which they are held against the shoulder on the holding member. The locking member ensures that the pipe be held against detachment from the main body. The window openings enable the visual inspection of the pipe in the main body.

According to a third aspect of this invention, the connector further includes a cylindrical member fitted between the resilient arms on the main body and the holding member axially movably on the holding member. The cylindrical member may alternatively be so shaped as to be movable with the main body. The cylindrical member holds the main body and the holding member together tightly and thereby prevent any vibration or displacement of the pipe relative to any part of the connector, so that the connector may maintain a fluidtight joint for a long period of time even in an environment causing vibration.

These and other features and advantages of this invention will become apparent from the following description and the accompanying drawings.

DESCRIPTION OF THE PREFERRED EMBODIMENTS

Figure 1:
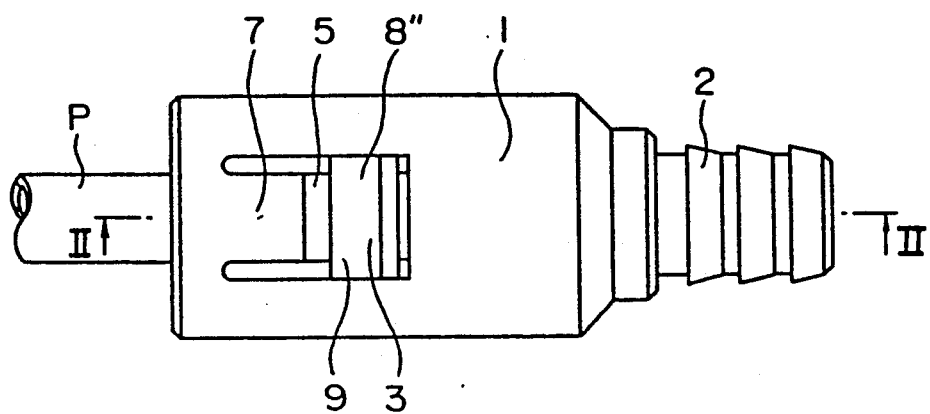
FIG. 1 is a top plan view of a connector according to a first embodiment of this invention with a pipe connected therein.
Figure 2:
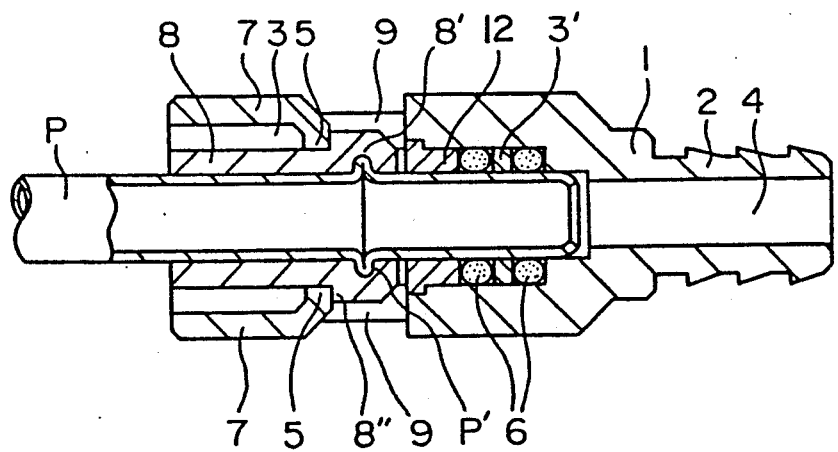
FIG. 2 is a sectional view taken along the line II—II of FIG. 1.
Figure 3:
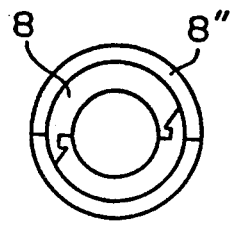
FIG. 3 is a rear elevational view of the holding member employed in the connector of FIG. 1.

Reference is first made to FIGS. 1 to 3 showing the connector according to the first embodiment of this invention. It comprises a hollow, generally cylindrical main body 1 having a connecting end portion 2 to which, for example, a resin tube, or rubber hose not shown in connected. The main body 1 defines a small-diameter chamber 3' connected with the axial bore 4 of the connecting end portion 2 coaxially therewith, and having a diameter which is larger than that of the bore 4, and a large-diameter chamber 3 connected with the small-diameter chamber 3' coaxially therewith, and having a diameter which is larger than that of the small-diameter chamber 3'. The large-diameter chamber 3 is surrounded by a wall having a pair of diametrically opposite window openings 9. The main body 1 also has a pair of resilient arms 7 each forming an integral part of the wall surrounding the large-diameter chamber 3. Each arm 7 extends in one of the window openings 9 from its edge remote from the small-diameter chamber 3', and has a radially inwardly bent free end defining a pawl 5.

The small-diameter chamber 3' is provided with a pair of (or a plurality of) seal rings 6 made of, for example, rubber, and spaced apart from each other by a spacer, and also with a bush 12 fitted between one of the seal rings 6 and a shoulder at the junction between the large- and small-diameter chambers 3 and 3'.

The connector further includes a generally cylindrical holding member 8 positioned in the large-diameter chamber 3. The holding member 8 has an annular interlocking groove 8' formed in its inner surface at its end close to the small-diameter chamber 3', and a pipe P fitted in the connector has an annular wall projection P' which is engaged in the groove 8'. The holding member 8 may alternatively have a pair of arcuate grooves 8', while the pipe P has a pair of arcuate wall projections P'. Other interlocking arrangements are, of course, possible, and will hereinafter become apparent. The outer surface of the holding member 8 has a shoulder 8" against which the pawls of the resilient arms 7 on the main body 1 are held to secure the holding member 8 in position about the pipe P.

Figure 4:
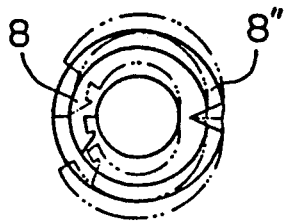
FIG. 4 is a view similar to FIG. 3, but showing the holding member employed in a second embodiment of this invention.
Figure 5:
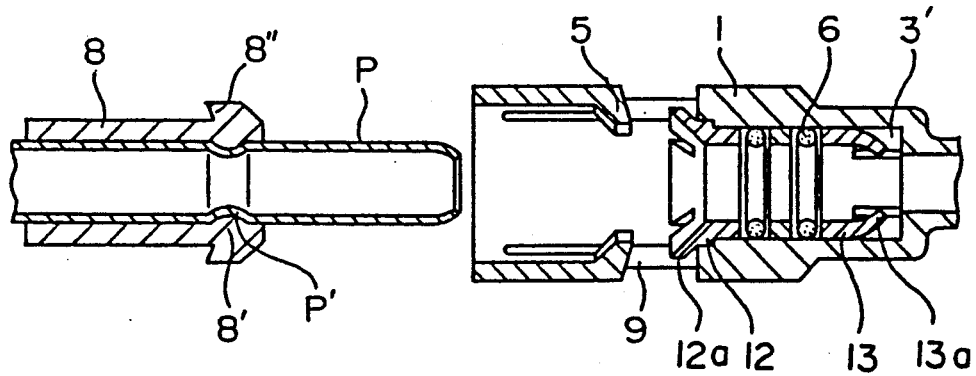
FIG. 5 is a longitudinal sectional view of the connector according to the second embodiment of this invention into which a pipe is going to be connected.

The holding member 8 may be of the split construction as shown in FIG. 3, or may be constructed as a single unit as shown in FIG. 4. Moreover, it may be prepared as a molded product on the pipe P.

Figure 6:
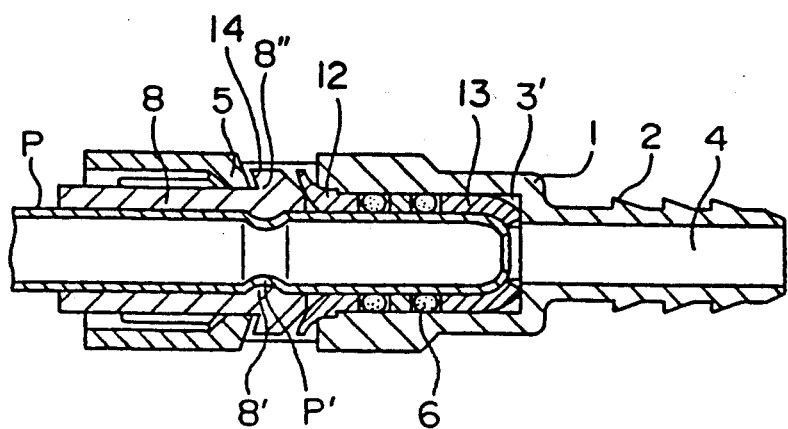
FIG. 6 is a longitudinal sectional view of the connector of FIG. 5 which shows the pipe in the process of being connected.
Figure 7:
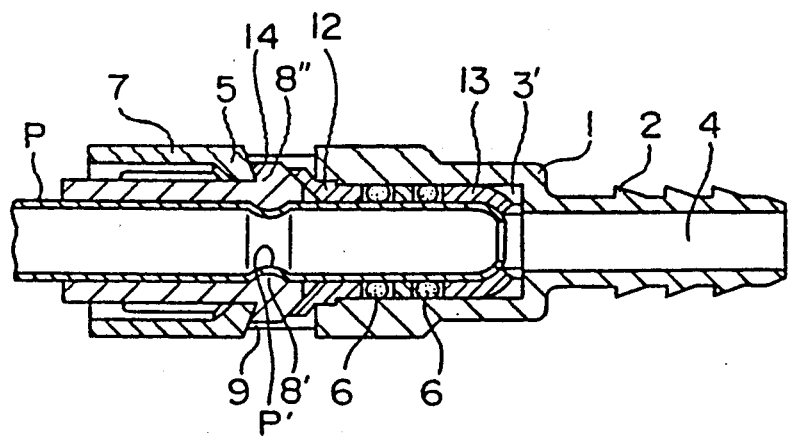
FIG. 7 is a view similar to FIG. 6, but showing the pipe as connected.
Figure 8:
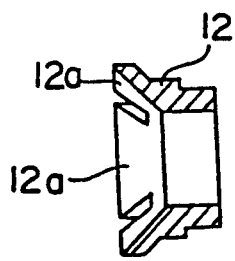
FIG. 8 is a longitudinal sectional view of the bush employed in the connector of FIGS. 5 to 7.
Figure 9:
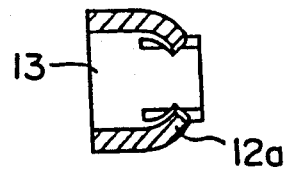
FIG. 9 is a longitudinal sectional view of the sleeve employed in the connector of FIGS. 5 to 7.

Description will now be made of the second embodiment of this invention with reference to FIGS. 5 to 9. This is an improvement over the first embodiment. According to this embodiment, the bush 12 has a plurality of resilient pawls 12a projecting radially outwardly into the large-diameter chamber 3. The pawls 12a are held on their back side against the shoulder at the junction between the large- and small-diameter chambers 3 and 3', and are engageable on their front side with the end projection of the holding member 8 defining the shoulder 8", as shown in FIG. 7. The connector further includes a sleeve 13 fitted in the small-diameter chamber 3' on the opposite side of the seal rings 6 from the bush 12. The sleeve 13 has at its end adjacent to the connecting end portion 2 of the main body 1 a plurality of resilient pawls 13a which holds the inner end of the pipe P so as to urge it radially inwardly. The pawls 5 and the shoulder 8" have mutually complementary inclined surfaces 14 which contact each other, as shown in FIG. 7. If a large axial force acting upon the pipe P, or the main body 1 tends to cause the surfaces 14 to be separated as shown in FIG. 6, the spring force of the resilient pawls 12a and 13a immediately urges the surfaces 14 to contact each other again, and thereby ensures that the main body 1 and the pipe P be always held against any axial displacement from each other.

Figure 12:
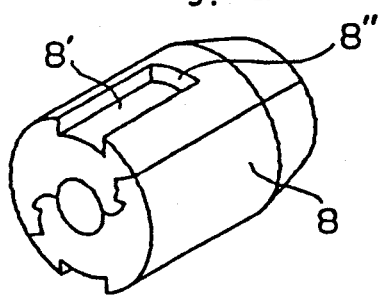
FIG. 12 is a perspective view of the holding member employed in the connector of FIG. 10(b)
Figure 13:
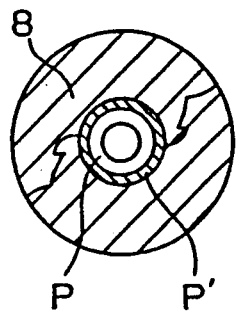
FIG. 13 is a transverse sectional view of the holding member and pipe engaged with each other in the connector of FIG. 10(b)

The third and fourth embodiments of this invention will now be described with reference to FIGS. 10 to 16. The third embodiment is a modification of the first embodiment. According to this embodiment, the connector includes a holding member 8 having a pair of diametrically opposite and axially extending grooves 8' formed in its outer surface to define a pair of shoulders 8" against which the pawls 5 on the main body 1 are held, and the holding member 8 contacts the inner wall of the large-diameter chamber 3 along a major part of its circumference to thereby prevent any vibration, or radial movement of the pipe P, as is obvious from FIGS. 10(b) and 11. The holding member 8 may be of the split construction as shown in FIG. 12 or 13, or may be constructed as a single unit. The interlocking engagement between the holding member 8 and the pipe P may be realized in a variety of ways including the combination of projections and recesses or grooves, or corrugations, the molding of the holding member on the pipe, and the use of an adhesive.

The connector according to the third embodiment is particularly characterized by including a cylindrical locking member fitted movably on the main body 1. The locking member 10 has a window opening formed in its wall and defining a pawl not shown to make a ratchet engagement with a groove formed in the outer surface of the main body 1, but not shown. The locking member 10 is rotatable, or axially slidable on the main body 1 to bring it into its locked position in which the resilient arms 7 are held against the holding member 8.

Figure 14:
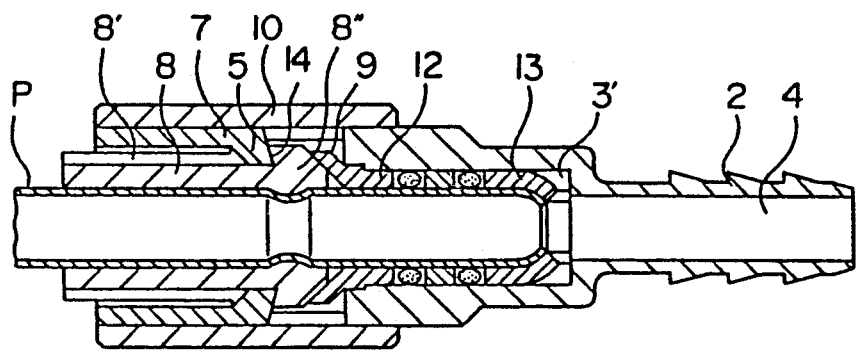
FIG. 14 is a view similar to FIG. 10(b), but showing a connector according to a fourth embodiment of this invention.
Figure 15:
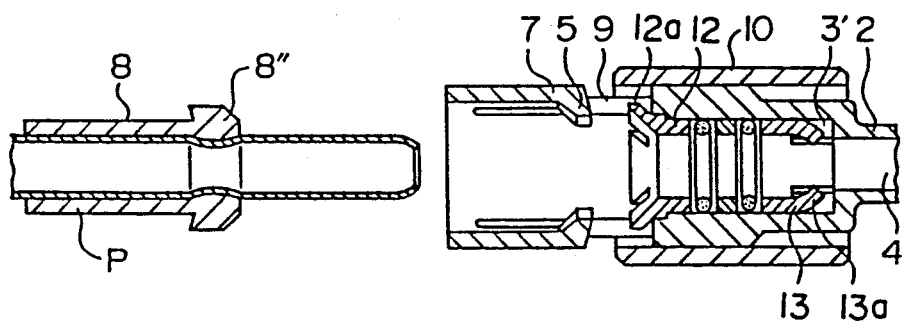
FIG. 15 is an exploded longitudinal sectional view of the connector of FIG. 14 and the pipe which is going to be connected thereinto.
Figure 16:
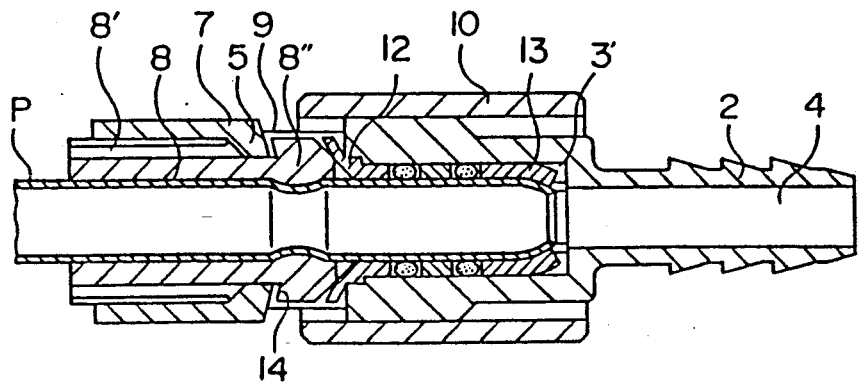
FIG. 16 is a view similar to FIG. 14, but showing the pipe in the process of being connected.
Figure 17A:
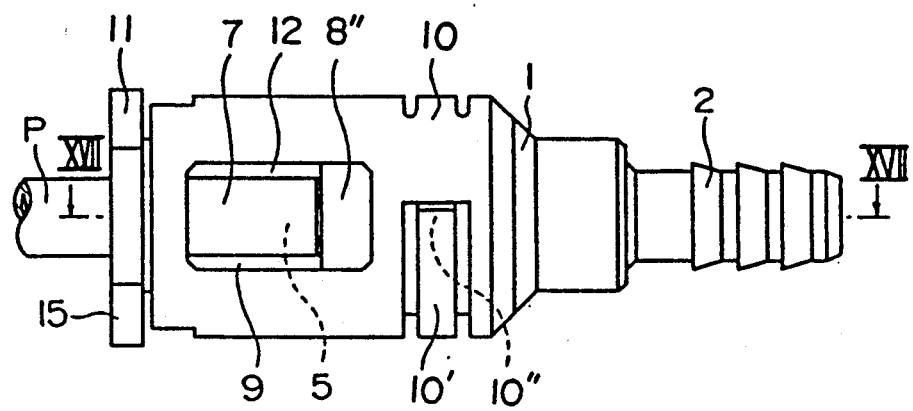
FIG. 17(a) is a top plan view of a connector according to a fifth embodiment of this invention which shows it in its unlocked position.
Figure 17B:
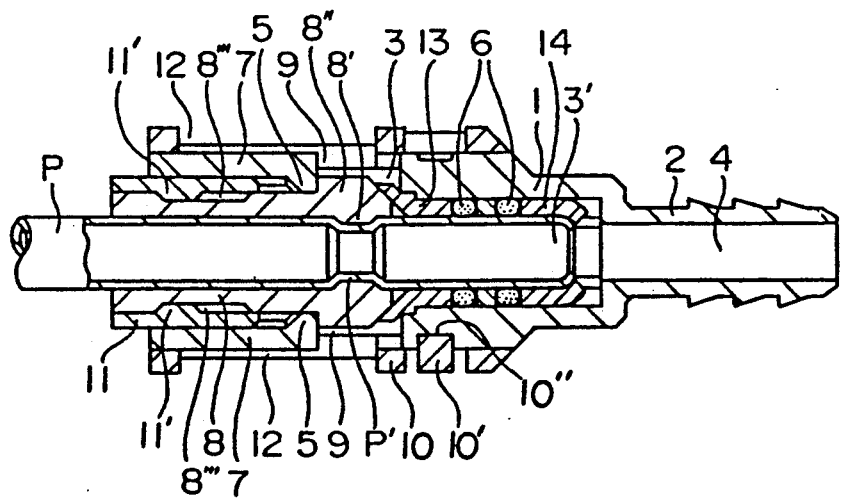
FIG. 17(b) is a sectional view taken along the line XVII to XVII of FIG. 17(a)
Figure 18:
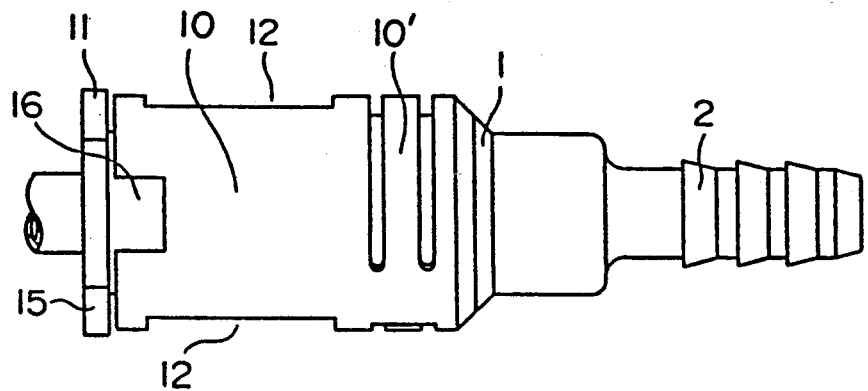
FIG. 18 is a view similar to FIG. 17(a), but showing the connector in its locked position.
Figure 19:
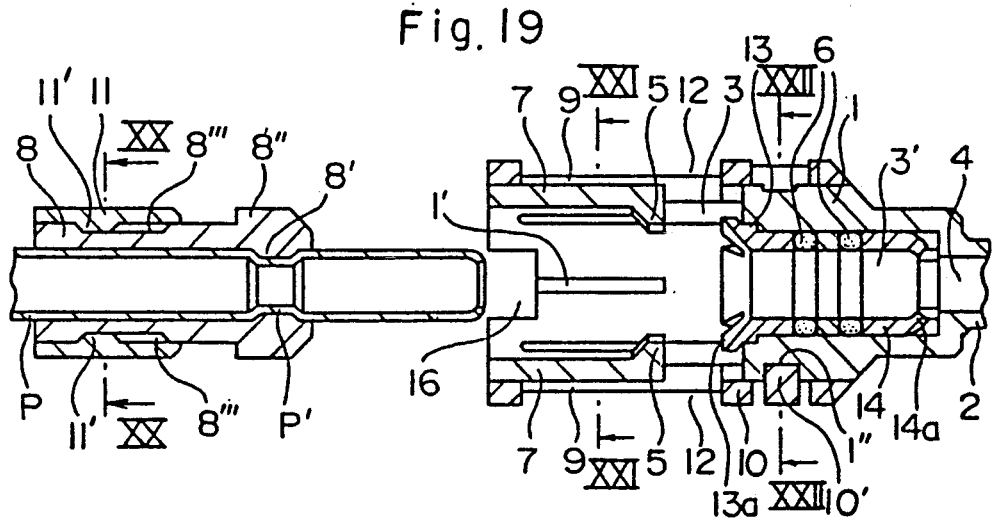
FIG. 19 is an exploded longitudinal sectional view of the connector according to the fifth embodiment of this invention and the pipe which is going to be connected thereinto.

The fourth embodiment of this invention is shown in FIGS. 14 to 16. This is a combination of the second embodiment shown in FIG. 7 and the third embodiment shown in FIG. 10(b). No detailed description is, therefore, made of the features which have already been described. The connector shown in FIGS. 14 to 16 has a holding member 8 of the type shown in FIG. 12, a bush 12 of the type shown in FIG. 8, a sleeve 13 of the type shown in FIG. 9, and mutually complementary inclined surfaces 14 on the pawls 5 and the shoulder 8" as shown in FIG. 7, as well as a locking member 10 of the type shown in FIG. 10(b). The contact of the inclined surfaces 14 which holds the pipe P against any axial displacement from the main body 1 is maintained by the action of the resilient pawls 12a and 13a which has already been described, and is ensured by the action of the locking member 10 as has already been described. The interlocking engagement between the holding member 8 and the pipe P is achieved by a projection formed on the inner surface of the holding member 8 and a recess formed in the wall of the pipe P, as is the case with the connector shown in FIGS. 5 to 7.

Attention is now directed to FIGS. 17 to 22 showing the fifth embodiment of this invention. This connector is generally of the same construction as the variations which have already been described. It comprises a main body 1 which has a connecting end portion 2 having a bore 4, a small-diameter chamber 3', a large-diameter chamber 3, a pair of window openings 9, and a pair of resilient arms 7 each having a pawl 5. The small-diameter chamber 3' contains a bush 12 having resilient pawls 12a, seal rings 6, and a sleeve 13 having resilient pawls 13a which are all fitted about a pipe P. No further description of these features is made, as they have already been described in detail.

The main body 1 has a pair of diametrically opposite grooves 1' formed in its inner surface and extending along its longitudinal axis, and a pair of slots 16 formed at the open end of the large-diameter chamber 3 and each connected to one of the grooves 1'.

The connector includes a cylindrical holding member 8 fitted about the pipe P in the large-diameter chamber 3. The holding member 8 has projections 8' formed on its inner surface adjacent to its inner end, and the pipe P has flattened wall portions P' in which the projections 8' are engaged. The holding member 8 has on its outer surface a shoulder 8" against which the pawls 5 on the main body 1 are held. The interlocking engagement between the holding member 8 and the pipe P may alternatively be effected by employing other arrangements as hereinabove stated. The holding member 8 may be of the split construction, or may be constructed as a single unit.

The holding member 8 has a pair of diametrically opposite and axially extending grooves 8'" formed in its outer surface, and contacts the inner wall surface of the large-diameter chamber 3 intimately to hold the pipe P against vibration.

Figure 22:
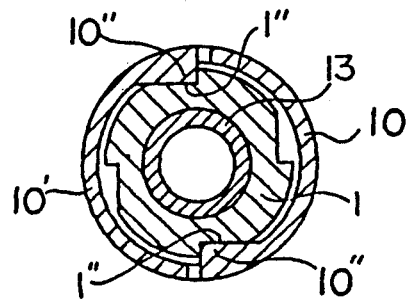
FIG. 22 is a sectional view taken along the line XXII—XXII of FIG. 19.
Figure 23A:
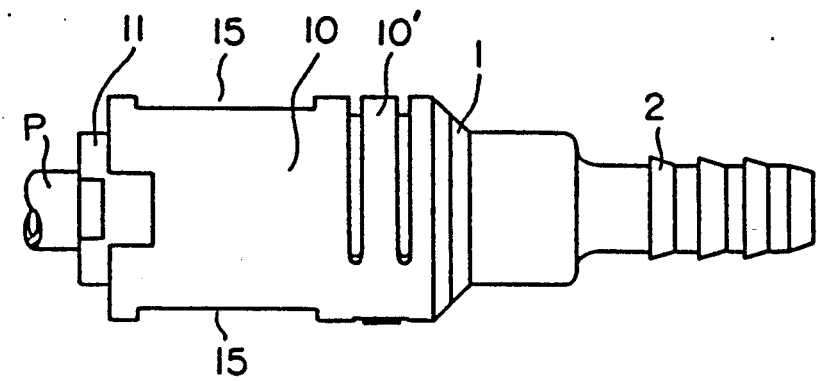
FIG. 23(a) is a top plan view of a connector according to a sixth embodiment of this invention which shows it in its unlocked position.
Figure 23B:
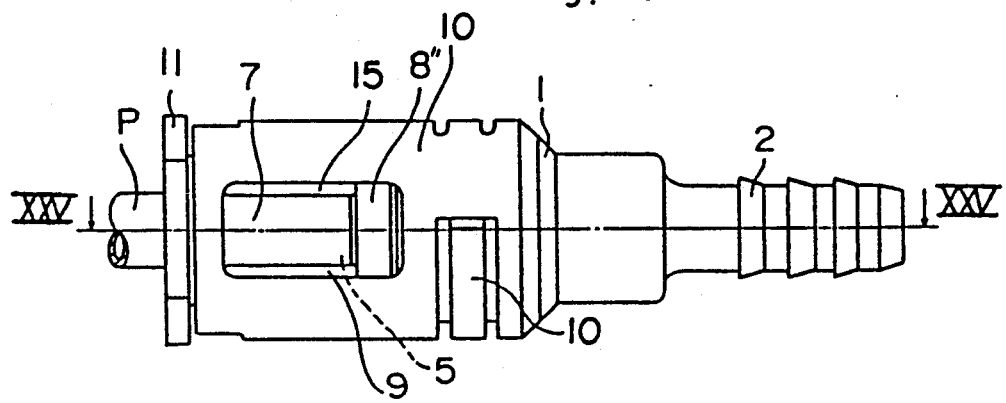
FIG. 23(b) is a side elevational view of FIG. 23(a)
Figure 24:
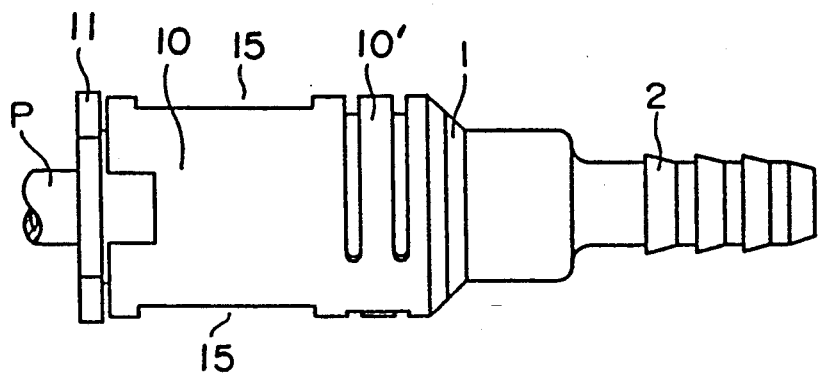
FIG. 24 is a view similar to FIG. 23(a), but showing the connector in its locked position.
Figure 25:
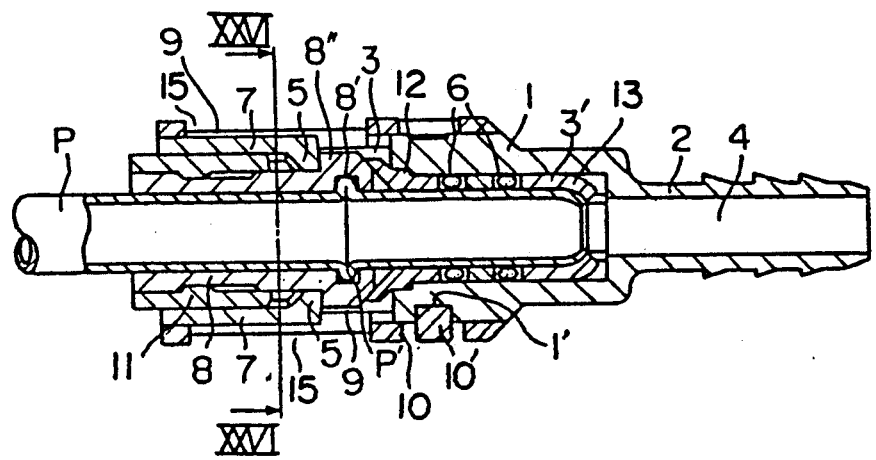
FIG. 25 is a sectional view taken along the line XXV—XXV of FIG. 23(b)
Figure 26:
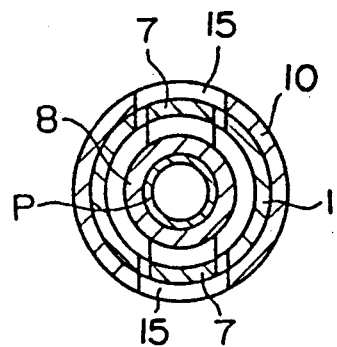
FIG. 26 is a sectional view taken along the line XXVI—XXVI of FIG. 25.
Figure 27:
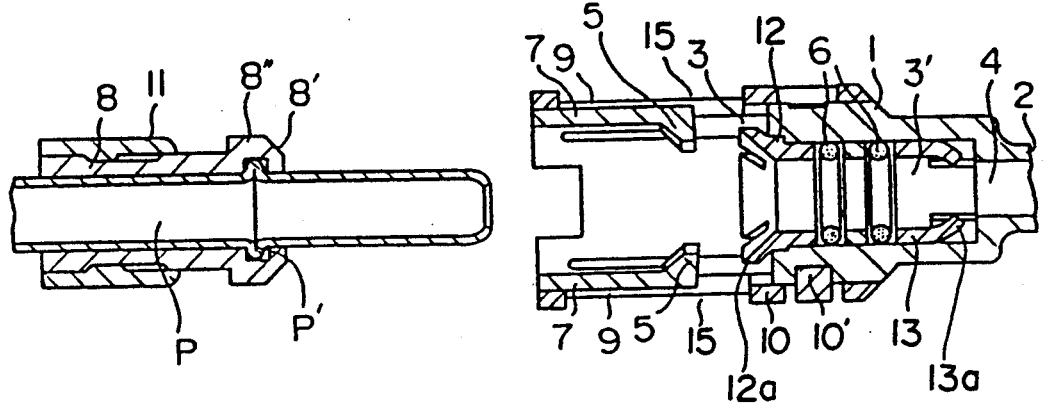
FIG. 27 is an exploded longitudinal sectional view of the connector according to the sixth embodiment of this invention and the pipe which is going to be connected thereinto.
Figure 28:
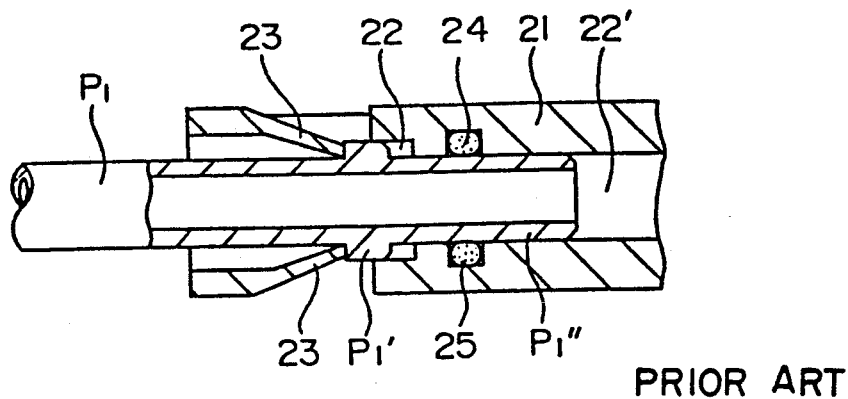
FIG. 28 is a longitudinal sectional view of a known connector with a pipe connected therein.
Figure 29:
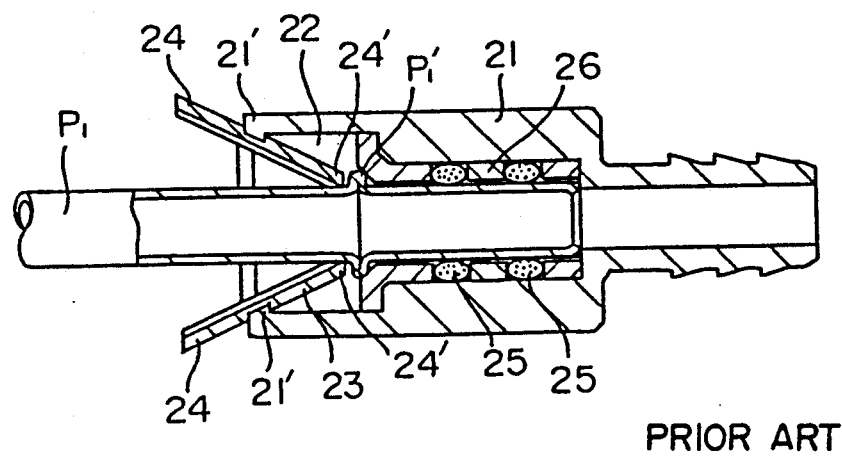
FIG. 29 is a view similar to FIG. 28, but showing a different known connector.

The connector also includes a cylindrical locking member 10 fitted about the main body 1. The locking member 10 has in its wall a pair of diametrically opposite window openings 15 which are alignable with the resilient arms 7 on the main body 1 if the locking member 10 is appropriately rotated about the main body 1. The locking member 10 has a pair of arcuate wall portions each defining an arm 10' having a pawl 10" at its end. Each pawl 10" is engageable with one of the recesses 1" formed in the outer surface of the main body 1, as shown in FIG. 22. The window openings 15 of the locking member 10 are so positioned relative to the resilient arms 7 on the main body 1 as not to be aligned with the arms 7 when the locking member 10 is in its locking position in which the pipe P is held against displacement from the main body 1, and in which the visual inspection of the joint is possible. If the locking member 10 is rotated into its position in which its window openings 15 are aligned with the arms 7, the pipe P can be disconnected from the main body 1.

Figure 20:
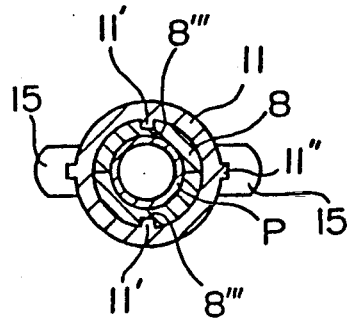
FIG. 20 is a sectional view taken along the line XX—XX of FIG. 19.
Figure 21:
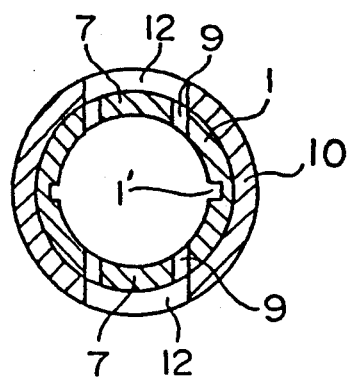
FIG. 21 is a sectional view taken along the line XXI—XXI of FIG. 19.

The connector further includes a cylindrical release member 11 fitted between the resilient arms 7 on the main body 1 and the holding member 8. It has a pair of diametrically opposite projections 11' formed on its inner surface and each engaging one of the grooves 8'" of the holding member 8, as shown in FIG. 20. The interlocking engagement between the holding member 8 and the release member 11 may alternatively be achieved by projections formed on the outer surface of the holding member 8 and grooves formed in the inner surface of the release member 11. The release member 11 also has a pair of diametrically opposite projections 11" formed on its outer surface and each engaging one of the grooves 1' of the main body 1. The release member 11 also has a pair of diametrically opposite and radially outwardly projecting arms 15 at its outer end. The release member 11 is axially movable along the holding member 8 to the extent that the pawls 5 on the main body 1 can be released form engagement with the shoulder 8' on the holding member 8.

Figure 10A:
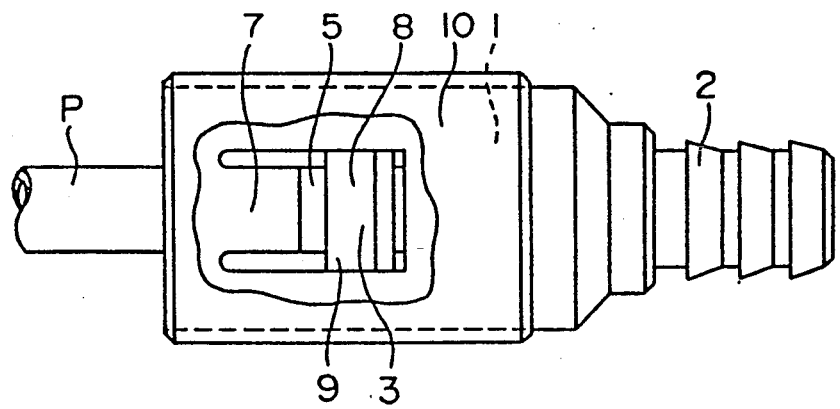
FIG. 10(a) is a partly cutaway top plan view of a connector according to a third embodiment of this invention.
Figure 10B:
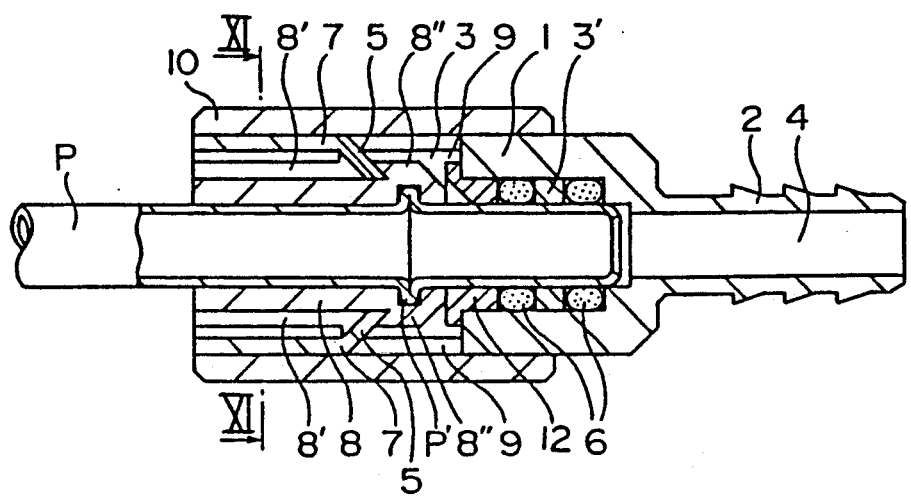
FIG. 10(b) is a longitudinal sectional view thereof.
Figure 11:
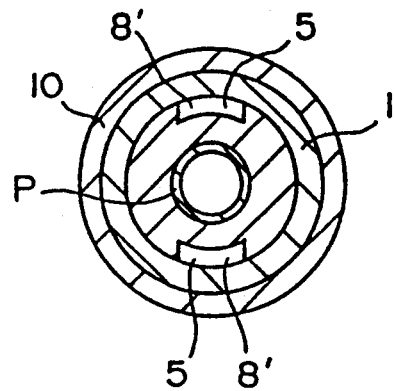
FIG. 11 is a sectional view taken along the line XI—XI of FIG. 10(b)

The sixth embodiment of this invention is shown in FIGS. 23 to 27. This is a modification of the fifth embodiment obtained by incorporating the interlocking engagement of the holding member 8 and the pipe P as shown in FIG. 2 or 10(b). The main body 1 of the connector has a connecting end portion 2, a small-diameter chamber 3', a large-diameter chamber 3, a pair of window openings 9, and a pair of resilient arms 7 each having a pawl 5. The small-diameter chamber 3' contains a bush 12 having resilient pawls 12a, seal rings 6, and a sleeve 13 having resilient pawls 13a which are all fitted about the pipe P. The holding member 8 has an annular groove 8' in which the wall projection P' of the pipe P is engaged, and a shoulder 8" against which the pawls 5 are held. The engagement between the pawls 5 and the shoulder 8" is ensured by the action of the resilient pawls 12a and 13a to hold the pipe P against axial displacement from the main body 1.

The connector also includes a cylindrical holding member 10 fitted about the main body 1 rotatably between its locking and unlocking positions, as hereinabove described. The connector further includes a cylindrical release member 11 fitted between the resilient arms 7 on the main body 1 and the holding member 8. The release member 11 holds the main body 1 and the pipe P together tightly to prevent any vibration, or radial movement of the pipe P, and is axially movable to disengage the pawls 5 from the shoulder 8" on the holding member 8, as hereinabove described. No further description is made of the holding or release member 10 or 11, or any other part of the connector, but reference is made to the foregoing description.

What is claimed is:

1. A connector for coupling pipes having a small diameter which comprises:

a generally cylindrical main body (1) having opposed first and second ends, a connecting end portion (2) at the first end of said main body with an axial bore (4), a small-diameter chamber (3') connected with said bore coaxially therewith and having a diameter which is larger than that of said bore, and a large-diameter chamber (3) at the second end of said main body connected with said small-diameter chamber coaxially therewith and having a diameter which is larger than said diameter of said small-diameter chamber, said large-diameter chamber being defined by a wall of said main body having a pair of diametrically opposite window openings (9), said wall defining a pair of resilient arms (7) each extending in one of said window openings form a location on said wall remote from said small-diameter chamber, each of said arms having a radially inwardly bent free end defining a pawl (5);

a pipe (P) having an end and a dimensional discontinuity (P') at a location spaced from said end;

seal ring means (6) fitted in said small-diameter chamber (3') for sealing engagement sealing engagement with said small-diameter chamber and around portions of said pipe between said end and said dimensional discontinuity; and a cylindrical holding member (8) having opposed inner and outer surfaces, said holding member (8) being fitted about said pipe (P) in said large-diameter chamber (3) and having interlocking means (8') formed on its inner surface for securely engaging the dimensional discontinuity (P') of the pipe (P), and shoulder (8") formed on its outer surface and facing away from the end of the pipe (P), said shoulder (8") being disposed between the small-diameter chamber and pawls and being engaged by said pawls for holding the holding member (8) and the pipe (P) engaged therewith in the main body (1).

2. A connector as set forth in claim 1, further including a cylindrical locking member (10) fitted movably on said main body (1) for preventing outward deflection of the resilient arms and thereby securely locking said holding member and said pipe in said main body.

3. A connector as set forth in claim 2, wherein said locking member (10) has a plurality of window openings selectively alignable with said resilient arms on said main body, whereby alignment of said window openings of said locking member with said resilient arms enables release of said pipe from said main body, and whereby misalignment of said window openings of said locking member with said resilient arms prevents deflection of said arms and locks said pipe in said main body.

4. A connector as set forth in claim 2, wherein said locking member (10) has a pair of window openings (15) which are alignable with said resilient arms (7), and a pair of arcuate wall portions (10') each defining an arm having a pawl (10") at its end, said pawl (10") being engageable with a recess (1") formed in the outer surface of said main body (1) for locking it in position.

5. A connector as set forth in claim 2, further including a cylindrical release member (11) fitted between said resilient arms (7) and said holding member (8), said release member (11) being axially movable along said holding member, and having interlocking means (11') engaging interlocking means (8"') formed on said holding member for preventing axially separation of said release member from said holding member.

6. A connector as set forth in claim 5, wherein one of said interlocking means (8"' and 11') comprises a plurality of grooves, while the other comprise a plurality of projections.

7. A connector as set forth in claim 5, wherein said release member (11) has on its outer surface an axially extending wall portion engaging an axially extending wall portion on said main body (1) so as to limit movement between the release member and the main body to axially movement.

8. A connector as set forth in claim 5, wherein said release member (11) is axially movable by the engagement of grooves and projections formed on the mating surfaces of said holding member (8) and said release member.

9. A connector as set forth in claim 5, wherein said locking member (10) has a plurality of window openings selectively alignable with said resilient arms on said main body.

10. A connector as set forth in claim 5, wherein said locking member (10) has a pair of window openings (15) which are alignable with said resilient arms (7), and a pair of arcuate wall portions (10') each defining an arm having a pawl (10") at its end, said pawl (10") being engageable with a recess (1") formed in the outer surface of said main body (1) for locking it in position.

11. A connector as set forth in claim 1, further including a bush (12) fitted in said small-diameter chamber (3') between said seal ring means (6) and said large-diameter chamber (3) and having a plurality of radially outwardly projecting end portions bearing on a shoulder at the junction between said small- and large-diameter chambers, and a sleeve (13) fitted in said small-diameter chamber (3') on the opposite side of said seal ring means (6) from said bush (12) and having a plurality of resilient pawls (13a) extending radially inwardly for exerting radially inward forces on the end of said pipe.

12. A connector as set forth in claim 1, wherein said interlocking means (8') on said holding member (8) comprises an annular groove, and said dimensional discontinuity (P') on said pipe (P) comprises an annular wall projection.

13. A connector as set forth in claim 1, wherein said holding member (8) is of split construction.

14. A connector as set forth in claim 1, wherein said pawls (5) and shoulder (8") have mutually complementary, radially inclined contact surfaces (14).

15. A connector as set forth in claim 1, wherein said holding member (8) comprises a material molded about said interlocking means (P') on said pipe (P).

16. A connector as set forth in claim 1, wherein said interlocking means (8') on said holding member (8) comprises a pair of projections, and wherein the dimensional discontinuity (P') on said pipe (P) comprises a pair of diametrically opposed flattened portions of said pipe.

* * * * *